(12) United States Patent
Itoh et al.

(10) Patent No.: US 6,456,032 B2
(45) Date of Patent: Sep. 24, 2002

(54) METHOD FOR CONTROLLING A MOTOR ROLLER

(75) Inventors: Kazuo Itoh, Kasai; Toshiyuki Tachibana, Himeji; Shigeki Fukata, Kasai, all of (JP)

(73) Assignee: Itoh Electric Co., Ltd., Hyogo (JP)

( * ) Notice: Subject to any disclaimer, the term of this patent is extended or adjusted under 35 U.S.C. 154(b) by 0 days.

(21) Appl. No.: 09/725,670

(22) Filed: Nov. 29, 2000

(30) Foreign Application Priority Data

Nov. 30, 1999 (JP) ........................................ 1999-399,967

(51) Int. Cl.⁷ ................................................ H02P 1/24
(52) U.S. Cl. ........................ 318/727; 318/254; 318/138; 318/439; 318/430; 318/703; 318/638; 318/364; 318/362
(58) Field of Search ................................ 318/254, 430, 318/703, 138, 439, 638, 678, 366, 364, 362, 727

(56) References Cited

U.S. PATENT DOCUMENTS

| | | | | |
|---|---|---|---|---|
| 5,192,859 A | * | 3/1993 | Kojima et al. | 318/638 |
| 5,587,640 A | * | 12/1996 | Ek et al. | 318/638 |
| 5,734,241 A | * | 3/1998 | Okada et al. | 318/254 |

\* cited by examiner

*Primary Examiner*—Karen Masih
(74) *Attorney, Agent, or Firm*—Koda & Androlia

(57) ABSTRACT

A motor driver for drive-controlling a brushless motor being provided with a delay circuit that detects the motor pulse. When a stop signal is inputted, a transistor is activated, which in turn activates an electric brake to brake the brushless motor, while at the same time, the motor pulse detected by the motor driver is inputted to the delay circuit. After the stop signal is inputted, the motor pulse declines, which is detected by the delay circuit to activate the electromagnetic brake. The delay circuit is provided on the driver substrate for the motor driver.

1 Claim, 2 Drawing Sheets

METHOD FOR CONTROLLING A MOTOR ROLLER

BACKGROUND OF THE INVENTION

1. Field of the Invention

The present invention relates to a method for controlling a motor roller, which is powered by a brushless motor equipped with a brake mechanism. Such a motor roller is effectively used for a conveyor, in particular, a conveyor that is repeatedly switched on and off.

2. Prior Art

A motor roller for a conveyor is usually stopped by an electric brake. What is stopped, however, is only the rotation of the motor roller itself. The conveyor itself can be moved easily by an external force, etc. On the other hand, in a mechanism in which the conveyor is stopped mechanically using an electromagnetic brake only, the brake pad is subjected to friction, which causes abrasion and shortens the life of the brake pad. In order to solve these problems, a number of methods have been devised to increase the electric brake power. Another method that has been devised for ensuring the stopping position uses both an electric inverter brake and a physical electromagnetic brake. In such a conventional method for controlling a motor roller for a conveyor using both an electric brake and an electromagnetic brake, the electric brake and the electromagnetic brake are activated at the same time.

In the conventional method in which an electric brake and an electromagnetic brake are activated at the same time, the electromagnetic brake is activated at high speed. This causes the brake parts to wear out quickly, shortening the life of the motor roller. On the other hand, adding an independent delay circuit in order to delay the activation timing of the electromagnetic brake with respect to the activation of the electric brake increases the cost.

BRIEF SUMMARY OF THE INVENTION

The present invention aims at solving these problems associated with the conventional methods by using a simple method to delay the activation timing of the electromagnetic brake until after the revolution of the brushless motor is reduced, thereby providing an economical motor roller that can be used over an extended period of time because the brake parts wear less.

To achieve the above object, a motor roller powered by a brushless motor is provided with a built-in electromagnetic brake, and a delay circuit is provided in a drive-controlling device for the motor. The delay circuit uses the motor pulse detected by a motor driver. When a stop signal is inputted, the motor pulse rate declines. This decline of the motor pulse rate is detected to activate an electromagnetic brake. Because the motor pulse can be detected by the motor driver, it is sufficient to mount the delay circuit for activating the electromagnetic brake on the driver substrate of the motor driver; there is no need to provide a special delay circuit device.

DETAILED DESCRIPTION OF THE INVENTION

An embodiment of the motor roller of the present invention will now be described with reference to the accompanying drawings.

Figure 2:
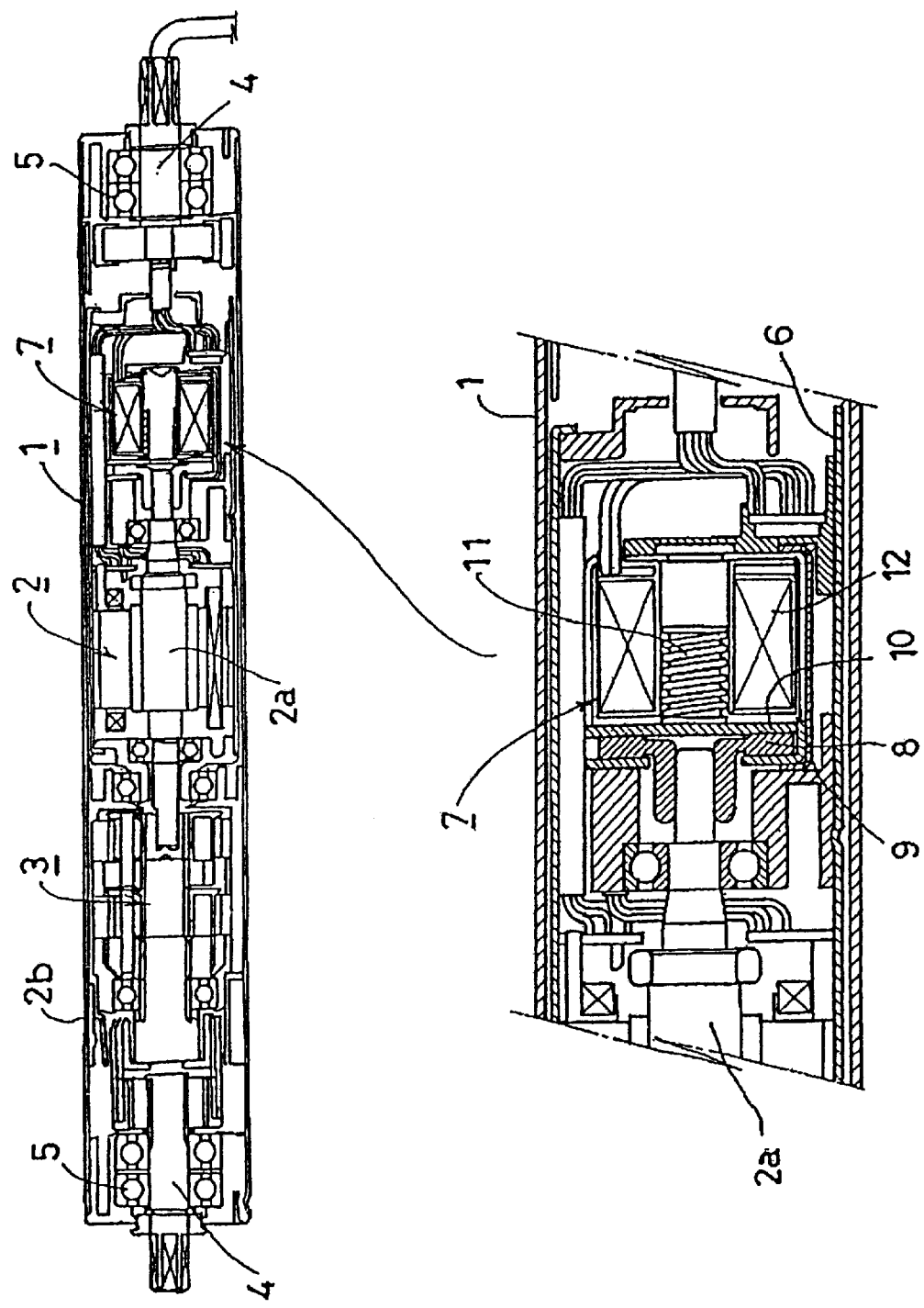
FIG. 2 is a longitudinal section view of the motor roller.

FIG. 2 is a longitudinal section of a motor roller. This motor roller includes a brushless motor 2 inside the outer casing 1. The rotation of the brushless motor 2 is transmitted to the outer casing from the output part 2b by first reducing the rotation of the rotor shaft 2a via the reduction gear 3. In other words, the outer casing 1, which is linked to the rotor shaft, rotates with respect to the fixed shaft 4, which is attached to one part of the conveyor. Between the outer casing 1 and the fixed shaft 4, a bearing 5 is mounted to smooth the rotation. Inside the outer casing 1, there is a fixed case 6, which is provided with an electromagnetic brake 7 so that the rotation of the rotor shaft 2a can be physically stopped.

FIG. 2 also shows an enlarged view of a section of the electromagnetic brake. This electromagnetic brake has an inner disk 8 at the tip of the rotor 2a. The inner disk 8 is sandwiched by an outer disk 9, which is a fixed part, and an electromagnetic plate 10, which is movable in the axial direction. The electromagnetic plate 10 is constantly pressed against the inner disk 8, which functions as a brake pad, by a spring 11. When the inner disk 8 is gripped by the outer disk 9 and the electromagnetic plate 10, a braking condition takes effect.

The electromagnetic plate 10, which is movable in the axial direction, is designed to be attracted by the electromagnetic coil 12 of the electromagnetic brake 7. When the electromagnetic coil 12 is not turned on, the electromagnetic brake works by the resilience of the spring 11. When the electromagnetic coil 12 is turned on and magnetic attraction is generated, the electromagnetic plate 10 is attracted to the electromagnetic coil 12, resisting the resilience of the spring 11, thereby releasing the brake.

Figure 1:
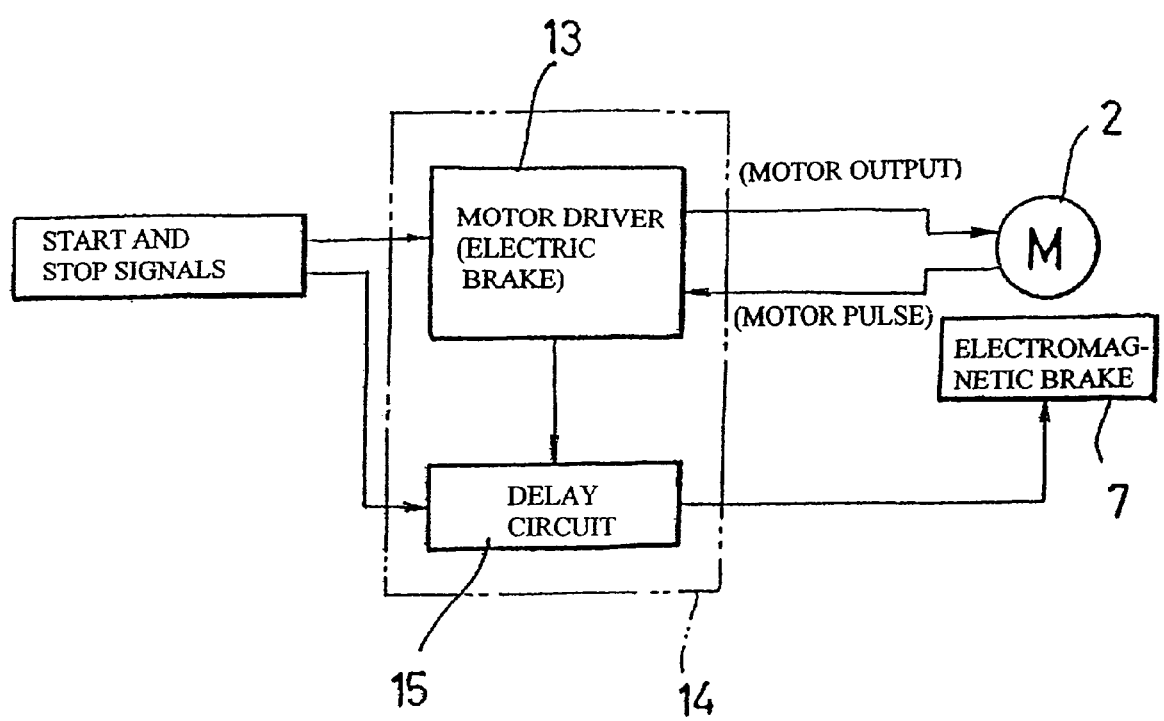
FIG. 1 is a block diagram showing the control method of the delay circuit.

FIG. 1 shows a schematic drawing of the motor-roller-controlling device with the brushless motor 2 built in. When the start switch of the conveyor is turned on, a start signal is sent to a motor driver 13. Then an electric current runs to the electromagnetic coil of the electromagnetic brake. This releases the electromagnetic brake while at the same time powering the brushless motor 2. The brushless motor 2 is rotated, and the rotation is transmitted to the outer casing of the motor roller.

When a stop signal is transmitted, a transistor is activated, which in turn activates an electric brake to slow down the brushless motor 2. Activation of an electric brake using a transistor is a widely used technique in a brushless motor. The motor pulse rate, which inevitably reflects the revolution of the brushless motor 2, is fed back to the motor driver 13.

In this invention, the driver substrate 14, on which the motor driver is mounted, is also provided with a delay circuit 15. The delay circuit 15 uses the motor pulse rate fed back to the motor driver to detect the decline of the motor pulse rate. In other words, after detecting that the motor pulse rate has sufficiently declined after the stop signal has been given, the electric current to the electromagnetic coil 12 of the electromagnetic brake 7 is cut off. When the electric current to the electric magnetic coil 12 is cut off, the attraction of the electromagnetic plate 10 by the electromagnetic coil is released, and the electromagnetic plate 10 is pressed against the inner disk 8 by the resilience of the spring 11. In other words, the electromagnetic brake 7 is activated, and the rotation of the brushless motor 2 is completely stopped.

The delay circuit 15 may activate the electromagnetic brake by either detecting the declining trend of the motor pulse or by confirming the cessation of the motor pulse. In the method in which the electromagnetic brake is activated when the declining trend of the motor pulse is detected, the motor roller can be stopped in a short period of time. According to this method, because the electromagnetic brake is activated after the electric brake is activated, the motor roller can be stopped with little shock, making it possible to avoid sudden friction with the inner disk 8, which is a friction part.

In the method in which the electromagnetic brake 7 is activated when the motor pulse rate of the electromagnetic brake becomes zero or very small, the time to a complete halt is determined by the characteristic of the electric brake. In this case, the time to a complete halt is longer than in the above case. After the electromagnetic brake is activated and the brushless motor is stopped, it is possible to prevent the motor roller or the conveyor from moving unnecessarily. The abrasion of the inner disk can also be reduced significantly.

The delay circuit 15 of the present invention need only consist of a circuit that detects changes in the motor pulse rate on the driver substrate 14 on which the motor driver is mounted, and there is no need to install a timer, an electromagnetic valve or other special delay circuits on the control board. This makes it possible to embody the present invention simply and inexpensively.

According to the method for controlling a motor roller described in claim 1 of the present invention, in a motor roller using both an electric brake and an electromagnetic brake, the electromagnetic brake can be activated only after the electric brake is activated and the revolution of the brushless motor is sufficiently reduced. This minimizes the abrasion of the brake parts. Accordingly, the present invention is quite effective for use with a belt conveyor that needs to be switched on and off frequently.

Because the delay circuit employed in the present invention uses the motor pulse that is detected by the motor driver, the present invention can be embodied by simply adding the delay circuit to the motor substrate. Therefore, there is no need to install a special delay circuit device, making it possible to embody the present invention simply and inexpensively.

What is claimed is:

1. A method for controlling a motor roller powered by a brushless motor, in which the motor roller has an electrical brake and an electromagnetic brake, and the motor has a drive-controlling device, a delay circuit and a means for generating a pulse signal indicative of the number of revolutions of the motor, said method comprising the steps of:

detecting a pulse signal indicative of a number of revolutions of the motor;

inputting a stop signal into both said drive controlling device and delay circuit to immediately actuate the electric brake;

actuating the electromagnetic brake by means of said delay circuit when the number of revolutions of the detected pulse sign is equal to or less than a predetermined value; and continuing actuation of said electromagnetic and electric brakes until said motor roller stops.

* * * * *

UNITED STATES PATENT AND TRADEMARK OFFICE
CERTIFICATE OF CORRECTION

PATENT NO. : 6,456,032 B2
DATED : September 24, 2002
INVENTOR(S) : Kazuo Itoh et al.

It is certified that error appears in the above-identified patent and that said Letters Patent is hereby corrected as shown below:

<u>Title page,</u>
Item [30], Foreign Application Priority Data, change "Nov. 30, 1999 (JP) ......... 1999-399,967" to -- Nov. 30, 1999 (JP) ....... 1999-339,967 --

Signed and Sealed this

Eleventh Day of January, 2005

JON W. DUDAS
*Director of the United States Patent and Trademark Office*